United States Patent [19]

Gyugyi et al.

[11] Patent Number: 5,561,579
[45] Date of Patent: Oct. 1, 1996

[54] SOLID-STATE CIRCUIT BREAKER WITH FAULT CURRENT CONDUCTION

[75] Inventors: Laszlo Gyugyi, Pittsburgh; Miklos Sarkozi, Murrysville, both of Pa.

[73] Assignee: Electric Power Research Institute, Inc., Palo Alto, Calif.

[21] Appl. No.: 334,741

[22] Filed: Nov. 4, 1994

[51] Int. Cl.$^6$ ........................................... H02H 3/00
[52] U.S. Cl. ............................ 361/100; 361/87; 361/63
[58] Field of Search ................................ 361/58, 20, 87, 361/31, 93, 63, 100, 67; 363/50, 52–54, 55–58, 15; 323/276, 277

[56] References Cited

U.S. PATENT DOCUMENTS

| | | | |
|---|---|---|---|
| 3,558,983 | 1/1971 | Steen | 361/58 |
| 4,924,342 | 5/1990 | Lee | 361/58 |

*Primary Examiner*—Jeffrey A. Gaffin
*Assistant Examiner*—Ronald W. Leja
*Attorney, Agent, or Firm*—Flehr, Hohbach, Test, Albritton & Herbert

[57] ABSTRACT

A solid-state circuit breaker with fault current conduction is described. The circuit includes a power sensor connected to a power line having an up-stream side and a down-stream side. The output of the power sensor is conveyed to a switch selection circuit that identifies a line disturbance on the power line. In response to a line disturbance, the switch selection circuit generates a set of output signals. The output signals force the opening of a fault current interruption circuit including a set of turn-off thyristors. The turn-off thyristors respond to the line disturbance within a fraction of a power signal cycle to provide isolation between the up-stream side and downstream side of the power line. An alternate power source may then be applied to the down-stream side of the power line. If the line disturbance exists on the down-stream side of the power line, the output signals force the closing of a fault current conduction circuit including a set of thyristors connected in series with a reactor. The closing of the fault current conduction circuit forces the conduction of a fault current from the reactor that allows the activation of circuit breakers positioned on the down-stream side of the power line. As a result, a conventional hierarchical circuit breaker control strategy is maintained.

8 Claims, 2 Drawing Sheets

SOLID-STATE CIRCUIT BREAKER WITH FAULT CURRENT CONDUCTION

BRIEF DESCRIPTION OF THE INVENTION

This invention relates generally to protecting electric power distribution systems from line disturbances. More particularly, this invention relates to a solid-state circuit breaker that isolates line disturbances within a fraction of a power signal cycle and, in response to down-stream line disturbances, conducts fault current to activate down-stream distribution system circuit breakers.

BACKGROUND OF THE INVENTION

Electric power distribution systems are commonly exposed to line disturbances, also called transient conditions, current (voltage) transients, and short-circuit conditions. Line disturbances may arise from insulation breakdowns, lightning strikes, or other faults. Traditionally, mechanical circuit breakers have been used to protect electric power distribution systems from the effects of line disturbances. A mechanical circuit breaker uses metal contacts that are mechanically opened in the presence of a transient condition. A mechanical circuit breaker is usually operated from a trip-circuit that measures the magnitude and duration of the system current. When the system current exceeds a predetermined threshold, the mechanical circuit breaker is opened.

The operation of circuit breakers in an electric power distribution system needs to be coordinated. A line disturbance must be isolated or cleared by separating the portion of the power system adjacent to the line disturbance from the remaining portion of the power system. In this way, the line disturbance only effects a portion of the power system.

In such a scheme, down-stream circuit breakers that protect individual equipment and feeder lines are activated first. If the down-stream circuit breakers fail to clear the fault, then up-stream circuit breakers are activated. The up-stream circuit breakers isolate large numbers of feeder lines, power generators, and other important elements of the power system. Thus, activation of up-stream circuit breakers can have a substantial effect on the operation of the entire power system. Consequently, it is highly desirable to rely upon down-stream circuit breakers to clear a line disturbance.

Quality requirements for electric power supply systems have increased dramatically in recent years. Modern automated manufacturing and process controls use complex machinery and data handling equipment that employ sophisticated electronic switching and control circuits. The switching and control circuits are extremely sensitive to supply voltage variations. Small supply voltage variations may cause the switching and control circuits to malfunction or fail. As a result, manufacturing or related operations may be interrupted or suspended. Such interruptions or suspensions result in significant monetary losses in all types of commercial operations.

To solve the problem of supply voltage variations it is necessary to use circuit breakers that can be activated within a fraction of a power signal cycle. Mechanical circuit breakers are not fast enough for this purpose. However, solid-state power semiconductors with sub-cycle response times have recently been developed. Thus, it is possible to rely upon solid-state power semiconductors to isolate line disturbances and thereby prevent supply voltage variation problems.

Solid-state power semiconductors can be used to provide sub-cycle isolation of a down-stream line disturbance. However, if used in this fashion, then the down-stream protective devices are not used. As indicated above, it is desirable to rely upon down-stream protective devices to clear line disturbance. Thus, it would be highly desirable to provide a solid-state circuit breaker that provides sub-cycle isolation of line disturbances, but also allows for the operation of installed down-stream circuit breakers.

SUMMARY OF THE INVENTION

The invention is a solid-state circuit breaker with fault current conduction. The circuit includes a power sensor connected to a power line having an up-stream side and a down-stream side. The output of the power sensor is conveyed to a switch selection circuit that identifies a line disturbance on the power line. In response to a line disturbance, the switch selection circuit generates a set of output signals. The output signals force the opening of a fault current interruption circuit including a set of turn-off thyristors. The turn-off thyristors respond to the line disturbance within a fraction of a power signal cycle to provide isolation between the up-stream side and down-stream side of the power line. An alternate power source may then be applied to the down-stream side of the power line. If the line disturbance exists on the down-stream side of the power line, the output signals force the closing of a fault current conduction circuit including a set of thyristors connected in series with a reactor. The closing of the fault current conduction circuit forces the conduction of a fault current from the reactor that allows the activation of circuit breakers positioned on the down-stream side of the power line. As a result, a conventional hierarchical circuit breaker control strategy is maintained.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
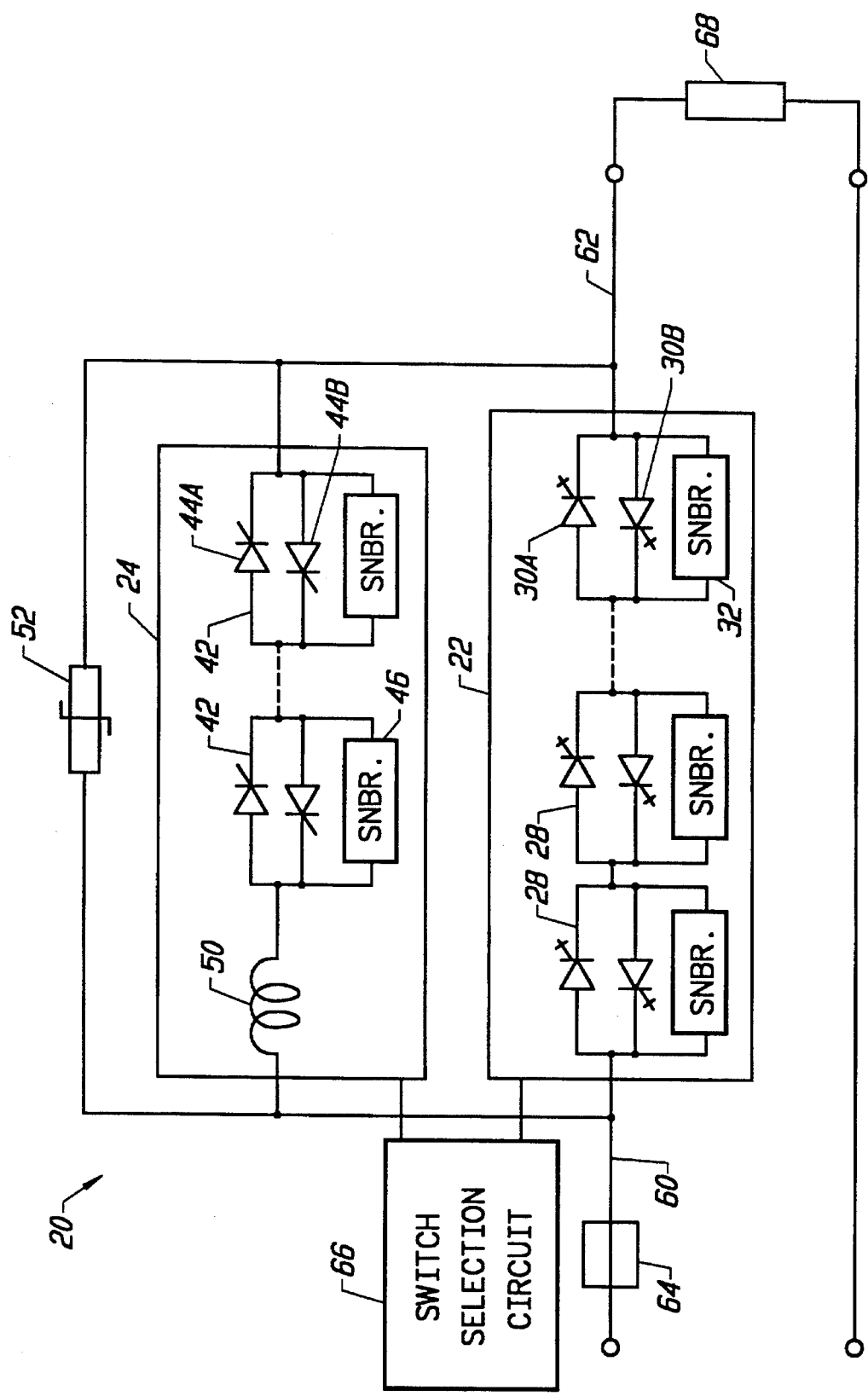
FIG. 1 illustrates a solid-state circuit breaker in accordance with the invention.

In accordance with one embodiment of the present invention, FIG. 1 illustrates a solid-state circuit breaker with fault current conduction 20. The circuit 20 includes a fault current interruption circuit 22 connected in parallel with a fault current conduction circuit 24. The fault current interruption circuit 22 includes a set of turn-off thyristor blocks 28 that form a series string. Each turn-off thyristor block 28 includes two turn-off thyristors 30A, 30B in an anti-parallel configuration. Each turn-off thyristor 30 provides sub-cycle response to a line disturbance. The turn-off thyristors 30 may be implemented as gate turn-off (GTO) thyristors, metal oxide semiconductor (MOS) controlled thyristors, or other suitable switching devices. Preferably, each turn-off thyristor block 28 also includes a snubber circuit 32 to limit the voltage rise rate or peak voltage across the turn-off thyristors 30 during switching or transient conditions.

As its name implies, the fault current interruption circuit 22 interrupts and isolates a line disturbance. More particularly, the turn-off thyristors 30 of each turn-off thyristor block 28 are opened to create an open circuit that isolates a line disturbance. The turn-off thyristors 30 respond within a fraction of a power signal cycle (sub-cycle response time). This response time is much faster than the response time of a mechanical circuit breaker.

To maintain a desirable hierarchical circuit breaker strategy wherein down-stream distribution system circuit breakers are heavily relied upon, to clear down-stream (load-side) faults the solid-state circuit breaker 20 of the invention includes a fault current conduction circuit 24. The fault current conduction circuit 24 includes a reactor 50 in series with a set of conventional thyristor blocks 42. Each thyristor block 42 includes a set of anti-parallel conventional thyristors 44A, 44B. Unlike the turn-off thyristors 30 of the fault current interruption circuit, conventional thyristors 44 only interrupt current at a natural zero crossing of the current waveform. The fault current conduction circuit 24 is normally open, but in the presence of a line disturbance, it closes to conduct fault current, provided by the reactor 50, to trip down-stream distribution system circuit breakers, as will be more fully described below.

In a preferable embodiment, each conventional thyristor block 42 includes a snubber circuit 46. The solid-state circuit breaker 20 may also include a parallel branch metal oxide arrestor 52.

The circuit 20 of the invention is connected between an up-stream line 60 and a down-stream line 62. A conventional power sensor 64 is used to sense any line disturbances. The output of the power sensor 64 is conveyed to a switch selection circuit 66. The switch selection circuit 66 determines whether the sensed power signal is within a predetermined set of parameters. If the sensed power signal is outside the predetermined set of parameters, the switch selection circuit 66 reverses the firing of the gates of the turn-off thyristors 30 and the conventional thyristors 44.

The turn-off thyristors 30 are normally closed by the switch selection circuit 66 and therefore conduct current. However, when the magnitude of the current reaches a predetermined threshold, the switch selection circuit 66 shuts-off the turn-off thyristors 30, thereby isolating a line disturbance. Thus, the fault current interruption circuit 22 operates as a main circuit breaker to prevent line disturbances on up-stream line 60 from reaching down-stream load 68, or vice versa.

The conventional thyristors 44 of the fault current conduction circuit 24 are normally open. However, when a down-stream line disturbance is identified, the conventional thyristors 30 are opened (brought into conduction) by the switch selection circuit 66. A down-stream line disturbance can be identified in any number of ways. For instance, such a disturbance can be identified by using power sensor 64 to determine whether the voltage is present with normal amplitude. If a down-stream line disturbance does exist, the thyristors 44 of the fault current conduction circuit 24 are switched to a closed state. This discharges the reactor 50 and produces a fault current that is sufficiently large to open the down-stream distribution system circuit breakers to clear the local fault. The reactor 50 ensures that the fault current in the system is kept as low as practical in order to limit the required surge current rating of the fault current conduction circuit 24. The reactor 50 also minimizes the disturbance on the distribution system.

As previously indicated, the conventional thyristors 44 of the fault current conduction circuit 24 are normally open. Therefore, they do not need a steady-state rating. Instead, they are rated for short duration fault surge currents. The turn-off thyristors 30 of the fault current interruption circuit 22 are rated for maximum normal line current, but not for fault currents.

Figure 2:
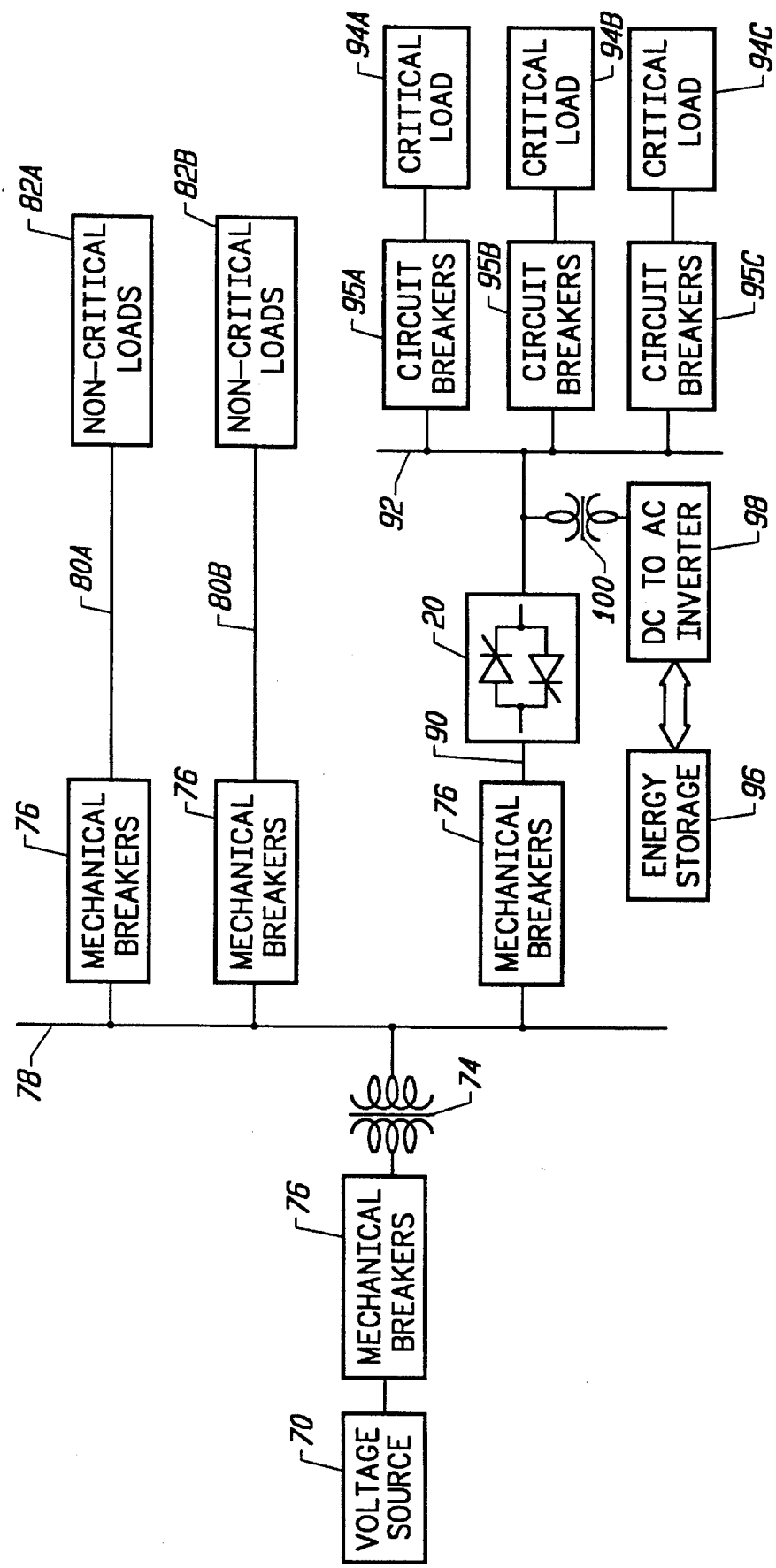
FIG. 2 illustrates the solid-state circuit breaker of FIG. 1 incorporated into a power distribution system.

The method and apparatus of the invention are more fully appreciated with reference to FIG. 2. FIG. 2 illustrates a voltage source 70 that delivers a voltage signal to step-down transformer 74. A mechanical breaker 76 is positioned between the voltage source 70 and the step-down transformer 74. The secondary of the step-down transformer 74 is connected to a distribution bus 78. A set of non-critical feeder lines 80A, 80B are connected to the distribution bus 78. Each non-critical feeder line 80 terminates in a non-critical load 82. Mechanical breakers 76 are used on each non-critical feeder line 80.

The distribution bus 78 is also connected to a critical feeder line 90. The critical feeder line 90 terminates in a down-stream feeder line 92. A set of critical loads 94A, 94B, 94C are connected to the down-stream feeder line 92. Down-stream circuit breakers 95A, 95B, and 95C are respectively positioned between the down-stream feeder line and the critical loads 94A, 94B, and 94C.

The solid-state circuit breaker 20 of the invention may be positioned between the distribution bus 78 and the down-stream feeder line 92. Thus, an upstream line disturbance on distribution bus 78 is isolated by the solid-state circuit breaker 20. In the presence of a down-stream line disturbance, the solid-state circuit breaker 20 passes fault current to trip down-stream circuit breakers 95. This allows possible faults at the individual critical loads 94 to be locally cleared. Note that the fault current interruption circuit 22 operates on a sub-cycle basis and therefore provides rapid isolation of the distribution bus 78. The fault current conduction circuit 24 uses conventional thyristors which are sufficiently fast to become conductive and trip the down-stream mechanical circuit breakers 95.

The power distribution system illustrated in FIG. 2 includes an alternate power source that is invoked in the presence of a line disturbance. This additional feature is shown to underscore the importance of the sub-cycle response time of the fault current interruption circuit 22.

FIG. 2 illustrates an energy storage element 96 that is connected to a DC-to-AC inverter 98. AC output from the inverter 98 is applied through a transformer 100 to the down-stream feeder line 92. The inverter 98 is activated in the presence of a line disturbance. In other words, in the case of an upstream fault when the solid-state circuit 20 is activated to isolate the down-stream feeder line 92 from the voltage source 70, the inverter 98 provides power to the down-stream feeder line 92. It should be noted that the sub-cycle response of the fault current interruption circuit 22 is necessary to insure that continuous power is delivered to the down-stream feeder line 92. In the absence of this quick response time, the output of the inverter 98 would be shorted to the distribution bus 78, thereby feeding the line disturbance. The inverter energy storage element 96, inverter 98, and transformer 100 may be substituted with another utility primary distribution feeder.

The fault current conduction circuit branch 24 should conduct fault currents for several cycles and the fault current interruption circuit 22 should disconnect a line disturbance in less than a half cycle. As previously indicated, the fault currents are handled by conventional thyristors. Compared to turn-off thyristors of the same wafer size, conventional thyristors handle considerably higher surge currents. Conventional thyristors are also commercially available with higher nominal current ratings and lower conduction losses.

The turn-off thyristors 30 of the fault current interruption circuit 22 are preferably opened for a maximum of one-half cycle (reclosing at the first voltage zero). Thereafter, the line current is sensed. If the line current returns to normal, the turn-off thyristor will remain in a conducting (closed) state with service restored following the sub-cycle interruption. If the abnormal conditions remain, the turn-off thyristors will operate again in the same manner. This scheme will allow down-stream circuit breakers 95 to clear a fault and thereafter open the upstream circuit breaker 20, preserving a desirable hierarchical circuit breaker strategy.

The conventional thyristors 44 of the fault current interruption circuit are preferably used to provide full fault current conduction to down-stream protective devices 95 for a maximum of 15 cycles.

The foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

We claim:

1. A solid-state circuit breaker, comprising:
   a power sensor connected to a power line to produce a sensed signal indicative of the power signal on said power line;
   a switch selection circuit connected to said power sensor to identify from said sensed signal a down-stream line disturbance on said power line and generate output signals in response thereto;
   a fault current interruption circuit connected to said power line and including a set of turn-off switching devices that are opened in response to said output signals to isolate said down-stream line disturbance; and
   a fault current conduction circuit connected to said power line and including a reactor, storing a fault current signal, connected in series with a set of switching devices to conduct, in response to said output signals, said fault current signal to the down-stream side of said fault current conduction circuit so as to activate down-stream distribution system circuit breakers.

2. The solid-state circuit breaker of claim 1 wherein said fault current interruption circuit includes a set of turn-off thyristor blocks.

3. The solid-state circuit breaker of claim 2 wherein each of said thyristor blocks includes anti-parallel turn-off thyristors.

4. The solid-state circuit breaker of claim 3 wherein each of said turn-off thyristor blocks includes a snubber circuit in parallel with said anti-parallel turn-off thyristors.

5. The solid-state circuit breaker of claim 1 wherein said fault current conduction circuit includes a set of conventional thyristor blocks.

6. The solid-state circuit breaker of claim 5 wherein each of said conventional thyristor blocks includes anti-parallel conventional thyristors.

7. The solid-state circuit breaker of claim 6 wherein each of said conventional thyristor blocks includes a snubber circuit in parallel with said anti-parallel conventional thyristors.

8. A method of processing a line disturbance on an electric power distribution system, said method comprising the steps of:
   sensing a power signal on said electric power distribution system;
   identifying a down-stream line disturbance on said electric power distribution system in response to said sensing step;
   opening, in response to said identifying step, a fault current interruption circuit including a set of turn-off devices to isolate said line disturbance; and
   closing, in response to said identifying step, a fault current conduction circuit including a reactor, storing a fault current signal, connected in series with a set of switching devices to conduct said fault current signal to activate distribution system circuit breakers positioned down-stream from said fault current conduction circuit.

* * * * *